Figure 1:
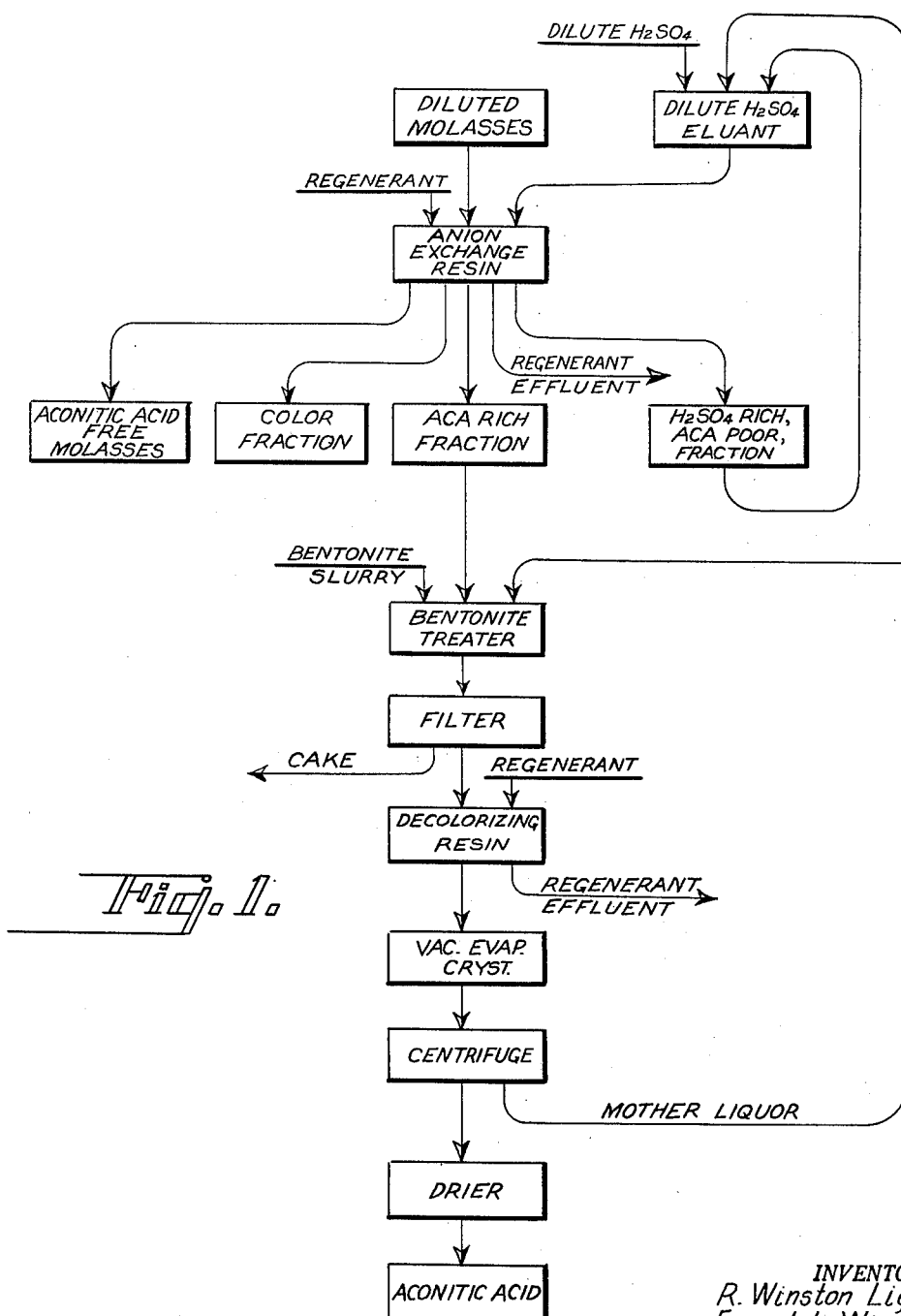

UNITED STATES PATENT OFFICE 2,640,849

RECOVERY OF ACONITIC ACID FROM MOLASSES

Robert Winston Liggett, Whitemarsh Village, Wyndmoor, and Ernest L. Wimmer, Springfield, Pa., assignors to The American Sugar Refining Company, New York, N. Y., a corporation of New Jersey Application August 12, 1950, Serial No. 179,062

5 Claims. (Cl. 260—527)

This invention relates to the recovery of aconitic acid from molasses, and more particularly from blackstrap molasses, whereby aconitic acid or its salts and complex salts as they occur in the molasses may be recovered with the maximum yield, without detracting from the value of the molasses.

According to the present invention, blackstrap molasses, after dilution, is passed over or contacted with an anion-exchange resin to effect substantially complete removal of aconitic acid from the aconitates of the molasses, with recovery of the aconitic acid from the anion exchange resin by treatment with a mineral acid to form an effluent containing the mineral acid and aconitic acid.

Aconitic acid is a tricarboxylic unsaturated acid and is of special interest in the production of resins, plastics, plasticizers, flavors, etc. It occurs naturally in low concentrations in the juices of the sugar cane and varieties of sorghum. When these juices are processed for the recovery of sugar, the aconitic acid is concentrated in the molasses which remains after the sugar extraction. Methods of treating molasses or other sugar-containing materials for the precipitation of alkaline earth aconitates therefrom are described in U. S. Patents Nos. 2,469,090, 2,359,537, 2,280,085 and 2,481,557. In all such precipitation processes, there is a residual amount of soluble aconitic acid in the molasses. The amount of soluble aconitic acid remaining in the molasses may be equal to, greater than, or less than the amount precipitated as the insoluble alkaline earth aconitates.

The present invention provides an improved process whereby blackstrap molasses, after dilution and without previous defecation, and containing aconitates in suspension therein, is treated with an anion exchange resin for the substantially complete removal of aconitic acid therefrom, leaving the molasses in a substantially aconitic acid-free state.

According to the present invention, blackstrap molasses is diluted to an operable Brix with water and is then contacted, without defecation to remove precipitated aconitates, with an anion exchange resin which has been converted to the salt form by either hydrochloric or sulphuric acid. An anion exchange occurs whereby the aconitic acid is adsorbed upon the resin and either chloride or sulphate ions are released into the molasses by the resin.

A considerable amount of the aconitate in molasses is present in an insoluble form as mixed alkaline earth aconitates. When blackstrap molasses is diluted to an operable Brix, a precipitate is formed, to a greater or less extent, which is rich in aconitates. Passage of this diluted molasses over the resin bed would be expected to cause flow blockage; and treatment of the molasses by a defecation process to remove colloids and suspended solids before passage over the resin bed would be considered a necessary preliminary treatment.

We have, however, made the surprising and unexpected discovery that under the conditions of the present invention, such removal of solid aconitates from the diluted molasses is not necessary, and that these aconitates will dissolve and be adsorbed upon the resin.

The aconitate in molasses is present in different forms and as part of a complex equilibrium between ionic aconitate, soluble non-ionic aconitate sequestering various polyvalent cations, and insoluble alkaline earth aconitates.

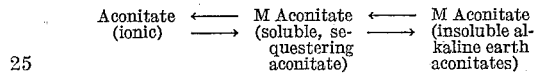

Aconitate (ionic) ⇌ M Aconitate (soluble, sequestering aconitate) ⇌ M Aconitate (insoluble alkaline earth aconitates)

We have found, however, contrary to expectation, that by proper carrying out of the process, the equilibrium depicted above is shifted to the left and the solid aconitates dissolve and are in turn adsorbed upon the resin so that removal of aconitate from the molasses is essentially complete.

When the capacity of the resin for removing aconitic acid from the molasses has been exhausted, the residual molasses is drained and flushed off with water and the aconitic acid is then carefully eluted from the resin with a solution of a mineral acid, advantageously hydrochloric or sulphuric acid.

We have found that the aconitic acid, and also the coloring matter adsorbed by the resin, can be eluted preferentially, and a fraction of the eluate obtained first containing most of the adsorbed coloring matter, followed by a fraction which is rich in aconitic acid and from which the aconitic acid can be recovered by evaporation and crystallization, after which a fraction poor in aconitic acid can also be obtained.

The molasses which is treated according to the present invention is blackstrap or other aconitate-containing molasses. Molasses of low aconitate content which cannot be readily treated by precipitation procedures to recover aconitate therefrom, are readily treated by the present process; as well as molasses of relatively high aconitate content.

In treating the molasses, it is first diluted to an operable Brix, which may vary somewhat with different molasses, e. g., between 15° and 65° Brix, but more advantageously around 30-50° Brix. Ease of operation is increased by dilution, but the cost of reconcentration of the effluent molasses is also increased. More highly concentrated molasses of higher solids concentration are not so readily treated and tend to give a high chloride or sulphate concentration in the effluent molasses as the result of anion exchange, and make the resin less effective.

After dilution of the molasses, it is sometimes advantageous to add the acid from the last fraction of the elution process, so that its aconitic acid content will be recovered with that in the molasses. This added acid will reduce the pH of the molasses somewhat before it enters the anion exchanger, and also reduce somewhat the suspended solids content.

The anion exchange resins used for treating molasses to remove aconitic acid therefrom are weakly basic resins in a salt form. Such weakly basic resins in salt form have a high capacity for aconitic acid, and the aconitic acid can be readily eluted from the exhausted resin bed.

We have found that the weak base resins have a good capacity for aconitic acid when the chloride form of the resin is treated in a column operation with molasses containing the aconitate salts. We have further found that aconitic acid may be readily eluted from a weak base resin in relatively concentrated form by mineral acids such as sulphuric or hydrochloric.

The resin is also advantageously used in a granular form such that the diluted blackstrap molasses can be forced through the resin bed without too great resistance to the flow therethrough.

A weakly basic resin which has been found advantageous for use in the process is a resin of the polyamine modified phenol-formaldehyde polymer such as described in U. S. Patent No. 2,402,384 and such as is marketed under the trade name Amberlite IR4B. Other weakly basic resins include resins with a polystyrene-divinyl-benzene base such as "Dowex 3," and "Amberlite IR45," and also resins such as "Permutit Deacidite" and "Ionac 293M." They may be utilized in either the chloride, bromide, sulphate, nitrate, phosphate or acetate salt form. The chloride and sulphate are practically more advantageous, particularly the chloride, which increases the chloride content but does not increase the sulphate content of the molasses. The use of the chloride form of resin also avoids any possibility of precipitation of calcium sulphate in the resin bed or in the effluent molasses. Other weakly basic anion exchange resins in salt form can also be used.

The treatment of the diluted blackstrap molasses with the anion exchange resin can be carried out in various ways.

The simplest and most acceptable procedure is to pass the molasses downflow over a bed of granular or porous resin packed in a vertical tank or column, such as columns of dimensions standard in the art for resin treatment. The molasses is pumped through the bed until the capacity of the resin is exhausted, i. e., until anion exchange is complete. But in order to obtain full utilization of the capacity of the resin, and substantially complete removal of aconitic acid from the molasses, a series of columns is advantageously used so that the aconitate which escapes removal in one column may be progressively removed by the succeeding columns. By first contacting the fresh molasses with the column most nearly exhausted, essentially countercurrent flow of molasses and resin is obtained.

The rate of flow of the molasses over the resin depends upon the type of molasses, the density (degrees Brix) the ratio of soluble-insoluble aconitates, and the particular method of contacting the resin and molasses. In general the flow should be at the maximum rate which will allow for essentially complete removal of aconitates from the molasses. Suspended solids, other than aconitates, will pass through the resin bed with the molasses, or may be in part held on top of the bed.

Where it is desirable to apply heat to the molasses to reduce its viscosity and facilitate its flow through the resin, care should be taken to avoid excessive heating which may agglomerate the suspended solids. The agglomerated solids tend to impede flow through the resin bed. Temperatures around 65-90° F. are suitable.

The molasses can also be passed upflow through a porous or granular resin bed.

When the capacity of the resin for aconitate has been exhausted, it is washed to remove the molasses, since it is important that the resin bed be as free as possible of impurities that might contaminate the aconitic acid in the eluate upon elution. The molasses is best removed from the resin by washing downflow with water. Suspended solids in the molasses which may be screened out by the resin during the anion exchange cycle are then readily flushed from the surface of the resin by a rapid backwash with water until a clear rinse water is obtained.

The aconitate or aconitic acid which has been adsorbed upon the resin by the process of ion exchange is eluted by passage of a solution of mineral acid downflow and over the resin which is contained in a vertical tank or column. Different mineral acids may be used, e. g., hydrochloric acid, sulphuric acid, hydrobromic acid, phosphoric acid, nitric acid, etc. Hydrochloric and sulphuric acids are particularly advantageous in concentrations of e. g. 2-25%, and preferably 4-15%. Lower acid concentrations are too weak to displace the aconitic acid satisfactorily, and too high acid concentrations may present difficulties in operation. A 10-15% solution of sulphuric acid is particularly advantageous as the eluant.

The elution of the aconitic is accelerated by the use of elevated elution temperatures; and such temperatures also enable higher aconitic acid-sulphuric acid ratios to be obtained in the eluate. The elevation temperature should, however, be kept below that which will destroy the stability of the resin employed. With polystyrene-divinyl-benzene base resins such as "Dowex-3" and "Amberlite IR45" a maximum temperature of around 95-100° C. is satisfactory. With "Amberlite IR4B" temperatures above 50° C. are impractical because of the instability of this resin at higher temperatures.

It is also important that the flow of the eluant acid over the resin be properly regulated and controlled. The rate of flow of the eluant should be slow enough to allow the resin and eluating solution to approach equilibrium conditions at all times during the elution cycle. The rate should also be adjusted so as to minimize channeling. The optimum rate is best determined experimentally because it is a function of the dimensions of the resin bed and the size and shape of the resin particles. It may be defined as the rate of flow which yields the maximum aconitic-eluant acid ratio.

By regulation of the flow of the eluant acid over the resin, a first fraction is obtained rich in coloring matter and containing little or no aconitic acid which can be discarded. Thereafter a fraction high in aconitic acid is collected after the pH drops below 3.0. We have found that when the exhausted resin bed is eluted at optimum conditions with 10% sulphuric acid, nearly all of the aconitic acid from the resin can be obtained in one fraction, the volume of which is equivalent to around 0.7 times the volume of the resin bed. A solution rich in aconitic acid, e. g., around 8%, and containing only small amounts of sulphuric or other acids present in molasses such as phosphoric and lactic acids can thus be obtained, from which pure aconitic acid is readily isolated. The residual aconitic acid on the resin is eluted into the next fraction of e. g. 1.5 volumes of eluate per volume of resin. This fraction is low in aconitic acid and contains e. g. about 9.5% sulphuric acid. It is desirably utilized by recycling and reuse as eluant solution or by adding it to molasses which is to be passed through the resin bed, for recovery of its aconitic acid content.

As illustrating the effect of flow rate of the eluant acid upon fractional elution of aconitic acid from the resin (Amberlite IR4B), a flow rate was used in one case of 0.030 volumes of 10% sulphuric acid per volume of resin per minute. In the first fraction collected after the pH dropped below 3.0, the percentage ratio of aconitic acid to sulphuric acid was 7.0 and the volume of this fraction one-half the volume of the resin. The next fraction had a percentage ratio of aconitic to sulphuric acid of .11 and was equal in volume to the volume of the resin, while the third fraction had a percentage ratio of 0.04. With a flow rate of 0.065 volumes of acid per volume of resin per minute, the percentage ratio of the first fraction was 1.9; of the second, 0.49; and of the third, .19. With a flow rate of 0.120 volumes of acid per volume of resin per minute, the first fraction showed a percentage ratio of 0.53; the second of 0.33; and the third of 0.25. These higher flow rates were less effective, while the lower flow rate gave a first fraction rich in aconitic acid and later fractions poor in aconitic acid.

This fractional elution of the aconitic acid from the resin whereby an aconitic acid-rich fraction is obtained, poor in sulphuric acid, while other fractions are obtained such as a color fraction and fractions containing other by-products such as phosphoric, lactic, succinic and other acids, is an advantageous method of operation. The fraction rich in aconitic acid is thereby obtained in a form relatively free from other impurities and from which pure aconitic acid can more readily be recovered.

The concentration of the aconitic acid in the eluate will vary with the strength of sulphuric or other acids used for the elution. Thus with the use of 5% sulphuric acid as the eluant the aconitic acid concentration in the first fractions of eluate may be from around 3-4.5%. With a 10% sulphuric acid eluant a concentration of around 7-9% aconitic acid can be obtained in the first fraction of the eluate.

After elution of the resin bed with hydrochloric or sulphuric or other acid, the resin is washed with water to remove the acid. If sulphuric acid has been used for elution, and if it is desired to operate with the regenerated resin in the chloride form, a solution of brine containing more than 3% sodium chloride is passed over the resin, using preferably two volumes of 10% sodium chloride per volume of resin. Similar anion exchanges can be made with other salt solutions after elution and before beginning a succeeding cycle. In general, the chloride form of the resin has been found more advantageous.

The aconitic acid-rich eluate fraction, containing around 3-9% aconitic acid, is treated for the recovery of crystalline aconitic acid therefrom. Among the impurities which may be present in this fraction are 0.1-0.4% phosphoric acid, normally present in molasses and co-adsorbed with the aconitic acid; around 1-3% sulphuric acid; and traces of organic acids, other than aconitic acid, normally present in molasses and which are co-adsorbed upon the resin. In general, aconitic acid is readily separated from these impurities by fractional crystallization. In addition, however, the eluate may be contaminated with coloring constituents not removed in the first color fraction of eluate, and which may require removal before the final crystallization. Treatment of the eluate with volcanic clay or bentonite, followed by treatment with a synthetic resinous decolorizing agent is an advantageous method of removing color.

In the accompanying drawings are shown flow sheets illustrating the invention in a somewhat conventional and diagrammatic manner. In the drawings.

Figure 2:
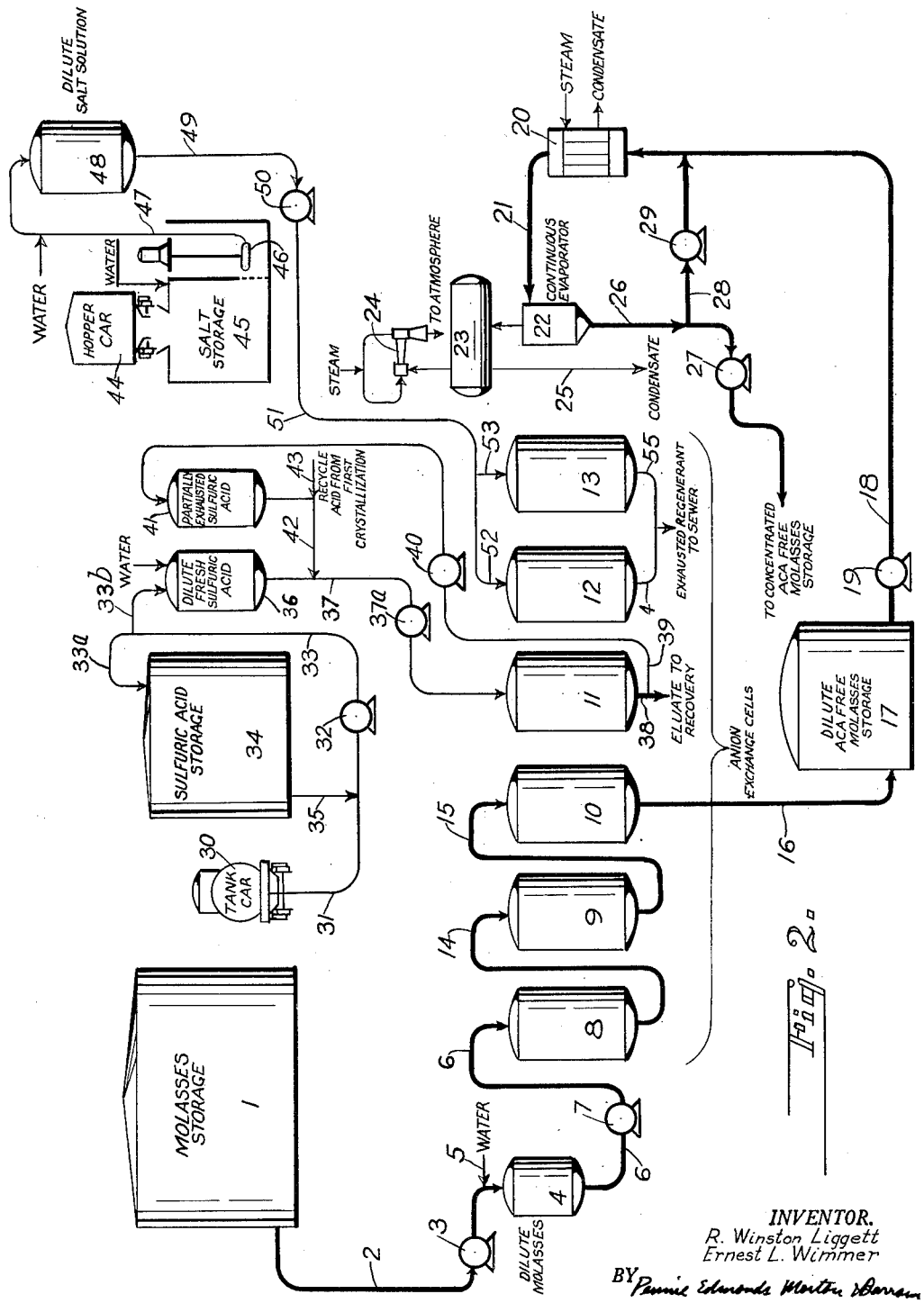
Figure 3:
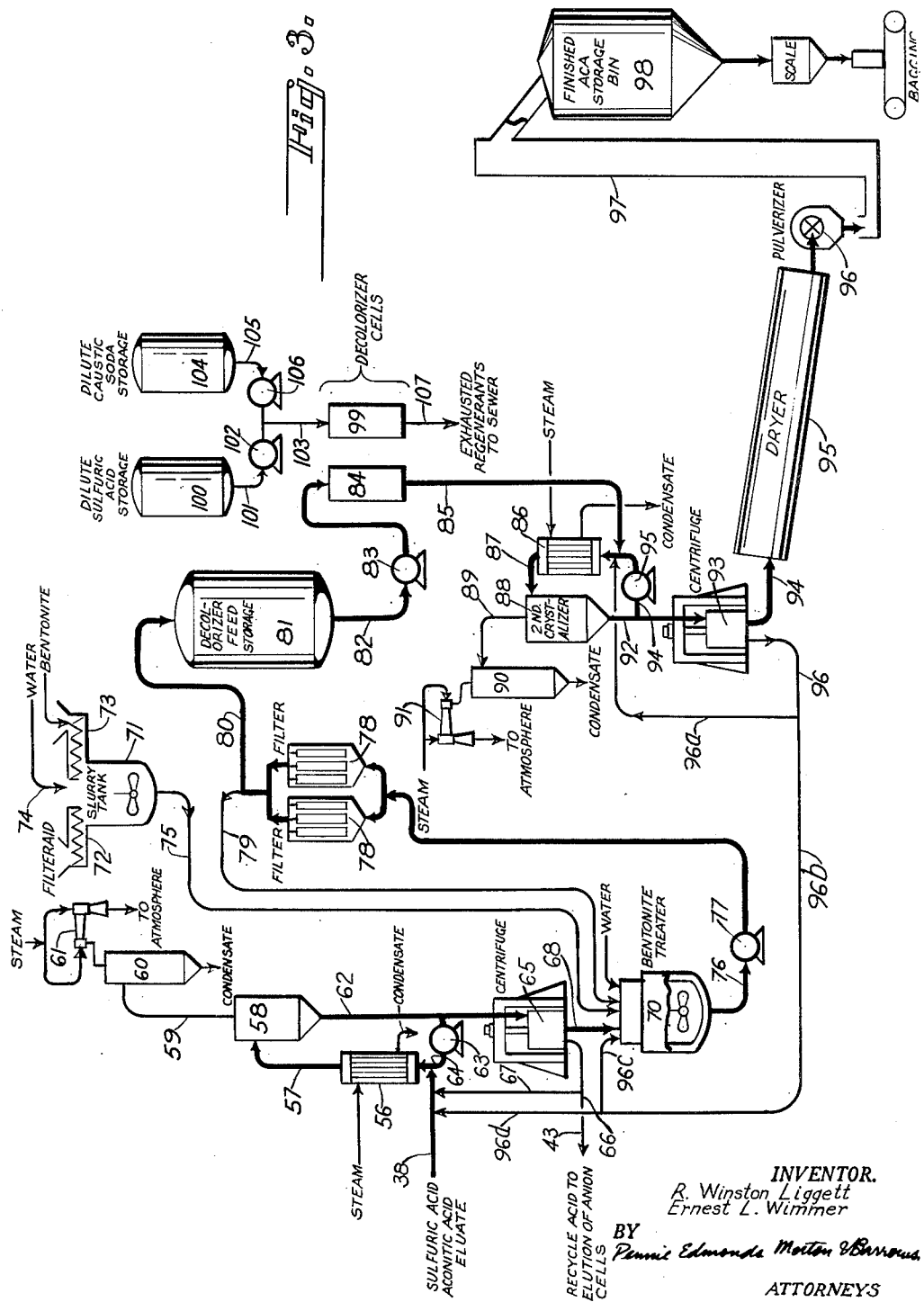

Fig. 1 shows the operations conventionally for treating the diluted blackstrap molasses and recovering as products therefrom an aconitic acid-free molasses and pure aconitic acid; and Figs. 2 and 3 together show in somewhat more detail an arrangement of apparatus and steps for the complete process, including countercurrent flow of molasses and resin and intermittent use and regeneration of the resin.

In the flow sheet of Fig. 1, blackstrap molasses diluted e. g. to around 30-50° Brix is passed through the anion exchange resin with regulated flow to remove aconitic acid therefrom and to give as one of the products of the process an aconitic acid-free molasses. The anion exchange resin, after it has been saturated with aconitic acid, and after washing to remove the molasses, is eluted with a dilute sulphuric acid eluant, and the product is shown as fractionated into a color fraction, an aconitic acid-rich fraction, and a fraction rich in sulphuric and poor in aconitic acid. This latter fraction is returned for use as part of the dilute sulphuric acid eluant. The regenerant for the anion exchange resin and the removal of the regenerant effluent are shown conventionally.

An aconitic acid-rich fraction is shown as being further treated for the recovery of crystalline aconitic acid of high purity therefrom. It passes to a bentonite treater where a small amount of bentonite slurry is added, followed by filtering to remove the bentonite slurry cake and passage of the filtered solution through a decolorizing resin to a vacuum evaporator crystallizer, where the aconitic acid solution is concentrated, and aconitic acid crystallized therefrom. The aconitic acid crystals are then separated in a centrifuge and, after washing, the product is dried and is a commercial high grade aconitic acid product.

The decolorizing resin is shown as provided with a regenerant and with indication of removal of the regenerant effluent.

The mother liquor from the centrifuge, which contains a relatively small amount of aconitic acid and an increased percentage of sulphuric acid from the concentration, is returned in part or in whole to the bentonite treater for again passing through the concentrating and crystallizing operation in admixture with fresh solution, or as passing to the dilute sulphuric acid eluant for use in the elution of the anion exchange resin.

Figs. 2 and 3 together illustrate the complete process in a conventional and diagrammatic manner, Fig. 2 illustrating the process up to the time the aconitic acid is recovered from the anion exchange resin as an eluate, while Fig. 3 illustrates the process of subsequent treatment of the aconitic acid eluate.

In the flow sheet of Fig. 2 blackstrap molasses from the storage tank 1 is pumped through the line 2 by the pump 3 to the dilute molasses tank 4 provided with an agitator and to which water is admitted through the line 5 to dilute the molasses. The diluted molasses is pumped through the line 6 by the pump 7 to the first of a series of anion exchange cells. The cells 8, 9 and 10 are connected in series so that the diluted molasses passes from the cell 8 through the line 14 to the cell 9 and then through the line 15 to the cell 10 from which the eluant molasses, which has been freed from its aconitic acid, passes through the line 16 to the dilute storage tank 17. The molasses is then pumped by the pump 19 through the line 18 to a continuous steam heated vacuum evaporator 20 and then through the line 21 to the evaporating chamber 22 connected to a condenser 23 and to a vaccum pump 24 for maintaining the necessary vacuum. The condensate from the condenser 23 escapes through the barometric condensate column 25.

The concentrated molasses passes from the separator 22 through the line 26 and may be recycled through the line 28 by the pump 29 for further concentration or pumped out through the pump 27 to a place of storage for the concentrated aconitic acid-free molasses.

The anion exchange cell 11 is shown as connected with the supply of dilute acid for removing the aconitic acid from the resin. Concentrated acid is supplied from a supply tank 30 through the line 31 by the pump 32 and the lines 33 and 33a to the sulphuric acid storage tank 34. Acid from this tank is drawn off through the line 35 and pumped by the pump 32 through the lines 33 and 33b to the dilute fresh sulphuric acid tank 36 provided with a stirrer and a water supply line for diluting the acid. The diluted acid is pumped through the line 37 by the pump 37a to the cell 11 at a regulated rate for effecting the removal of the aconitic acid therefrom giving an eluate in the form of a fraction rich in aconitic acid which passes through the line 38 for further treatment as illustrated in Fig. 3.

After the removal of the strong aconitic acid solution the following fraction poor in aconitic acid but relatively high in sulphuric acid is returned through the line 39 by the pump 40 to the partially exhausted sulphuric acid tank 41 and this acid can be returned through the line 42 for admixture with fresh sulphuric acid for treating the resin. Recycle acid or mother liquor from the first evaporator-crystallizer (Fig. 3) can also be returned to the process as indicated at 43 for use in further elution of the resin.

The last two cells 12 and 13 are shown as connected to the regenerant supply. A hopper car 44 is shown for supplying salt to the storage tank 45 to which water is admitted and the resulting salt solution pumped by the motor-driven pump 46 through the line 47 to the dilute salt solution tank 48, water being added as required to the line 47 to give a salt solution of proper strength. The dilute salt solution passes through the line 49 and is pumped by the pump 50 through the line 51 and branch lines 52 and 53 to the cells 12 and 13, the exhausted regenerant escaping through the lines 54 and 55.

In the flow sheet of Fig. 2 the first three anion exchange cells 8, 9 and 10 are shown connected in series; the cell 11 is shown as being used for removal of the aconitic acid from the resin, and the cells 12 and 13 are shown as connected to the regenerant.

It will be understood that all six cells will in practice be connected up so that they can be used successively. When the capacity of the resin of one cell to remove aconitic acid from molasses has been exhausted, this cell is removed from the system and the flow of molasses is directed to the inlet of the next cell and simultaneously the effluent from the third cell is directed to the inlet of a freshly regenerated cell. The cell removed from the system then becomes the cell connected to the acid for removing the aconitic acid. And the cell from which the aconitic acid has been removed then becomes a cell connected to the regenerant solution. By proper pipe connections between the different cells, which are omitted from the flow sheet, the cells can be used in rotation with counter-current flow of resin and molasses.

In the flow sheet of Fig. 3 the eluate containing aconitic acid and sulphuric acid passes through the line 38 to the steam heated vacuum evaporator 56 where the solution is concentrated and then through the line 57 to the crystallizing chamber 58 from which vapors escape through the line 59 to the condenser 60 maintained under a high vacuum by the vacuum pump 61. The slurry passes through the line 62 to the centrifuge 65 or can be recycled to a greater or less extent by the pump 63 through the line 64 to the vacuum evaporator. The separated crystals pass through the line 68 to the bentonite treater 70 while the mother liquor and wash water may in part be recycled through the line 67 for further concentration or may be in part passed through the line 66 to the line 43 where admixture with fresh or partly exhausted eluant acid is shown in Fig. 2.

The crude crystals are redissolved in the bentonite treater with addition of water and of bentonite slurry and then pumped through the line 76 by the pump 77 to one or the other of two filters 78 where the bentonite and filter aid are removed, with provision for recycling part of the solution through the line 79 to the bentonite treater and with the main portion going through the line 80 to the decolorizing feed tank 81, from which it is pumped through the line 82 by the pump 83 to one of two decolorizing cells 84 where it is passed downflow through a bed of decolorizing resin. The decolorized solution then passes through the line 85 to the second evaporator crystallizer including the steam heated evaporator 86 from which the concentrated solution passes through the line 87 to the crystallizer 88, the vapors from which escape through the line 89 to the condenser 90 maintained under a high vacuum by the steam jet vacuum pump 91.

The slurry from the crystallizer escapes through the line 92 to the centrifuge 93 or can be recycled to a greater or less extent to the evaporator crystallizer through the line 94 by the pump 95. The mother liquor and wash water from the centrifuge may be passed through the line 96 and the branch line 96-A to the second evaporator crystallizer or through the line 96-B and 96-C to the bentonite treater or through the line 96-D to the first evaporator crystallizer.

The washed aconitic acid crystals from the centrifuge pass through the line 94 to the drier 95 where they are dried and then to the pulverizer 96 and then through the elevator 97 to the storage bin 98 from which the crystals may be drawn off and packaged for sale.

The second decolorizer cell 99 is shown connected to the regenerants for the decolorized resin. Dilute sulphuric acid is supplied from the tank 100 by the pump 102 through the lines 101 and 103 to the cell 99. Similarly dilute caustic soda is supplied in the tank 104 and pumped by the pump 106 through the lines 105 and 103 to the cell 99. The exhausted regenerants pass through the line 107 to the sewer. The decolorizer cells 84 and 99 are intended for alternate use, one cell being used to decolorize the aconitic acid solution while the other cell is being regenerated.

The invention will be further illustrated by the following examples, but it will be understood that the invention is not limited thereto.

*Example 1*

Cuban blackstrap molasses is diluted to 50° Brix with water. It has a pH of 5.9 and an aconitic acid content of 24.4 grams per liter. This molasses is pumped over a bed of weakly basic anion exchange resin such as that above referred to (Amberlite IR4B) in the form of its chloride salt. The molasses feed rate is equivalent to 0.03 volumes of molasses per volume of resin per minute. In this example, the aconitic acid content in the effluent and the pH of the effluent were examined after the passage of successive volumes of effluent per volume of resin. The first volume of effluent contained only a trace of aconitic acid and had a pH of 3.7. The second volume of effluent contained 6.9 grams of aconitic acid per liter and had a pH of 4.5. The third volume contained 12.1 grams per liter and had a pH of 4.7. The fourth volume contained 15.2 grams per liter and had a pH of 5.0. The fifth volume contained 17.2 grams and had a pH of 5.1, and the sixth volume contained 18.4 grams aconitic acid per liter and had a pH of 5.2. In this case, the resin was practically exhausted after the passage of six volumes of molasses; and, in practice, the molasses would be passed through successive bodies of resin to effect substantially complete removal of aconitic acid therefrom.

After exhaustion of the resin's ability to exchange chloride for aconitate, the molasses was washed from the resin with water downflow and the bed then backwashed with water until a clean effluent was obtained. Upon settling, the resin is ready for elution of aconitic acid with sulphuric acid.

A solution of 10% sulphuric acid equivalent in volume to three times the bed volume is passed downflow over the resin at a flow rate of 0.03 volumes of acid per volume of resin per minute. Before aconitic acid appears in the effluent, a fraction is obtained which is highly colored. The pH rapidly drops below 3, and a fraction is then obtained which contains the greater part of the aconitic acid. A first fraction is thus obtained equal in volume to about half the volume of the resin, which contains 78.8 grams of aconitic acid and 17.9 grams of sulphuric acid per liter. A second fraction of about one volume per volume of resin is obtained, containing 11.2 grams of aconitic acid and 85.8 grams of sulphuric acid per liter. A third fraction was obtained containing 1.0 gram of aconitic acid and 97.2 grams of sulphuric acid per liter, and a fourth fraction containing only a trace of aconitic acid and 98.5 grams of sulphuric acid per liter.

The first fraction of eluate rich in aconitic acid is treated in accordance with the treatment indicated in the flow sheet of Fig. 1, first with bentonite using an amount of bentonite slurry equal to about 1% of the aconitic acid, and the solution was then passed over a bed of decolorizing resin (Permutit SD-102 or Permutit DR). 10 volumes of eluate are treated by each volume of decolorizer. The effluent is concentrated in vacuo, and crystalline aconitic acid is obtained upon cooling of the liquid. The product is obtained by centrifuging and drying.

The resin is washed with water and reconverted to the chloride salt form by rinsing with 2 volumes of 10% sodium chloride, and is ready for another molasses cycle.

*Example 2*

Cuban blackstrap molasses is diluted with water to 30° Brix. The molasses is pumped upward through a porous granular bed of the weakly basic anion exchange resin (Amberlite IR4B) in the chloride salt form. The resin is held from overflowing the column by a wire screen at the top of the column. The aconitic acid content of the molasses feed in this case was 16.1 grams per liter, and the flow rate 0.13 volumes of molasses per volume of resin per minute. In this example, with a single bed of resin, the first two volumes of molasses passed through the resin contained only a trace of aconitic acid. The third volume contained 2.8 grams of aconitic acid per liter; the fourth volume 6.4 grams; the fifth volume 9.7 grams; the sixth volume 10.5 grams; and the seventh volume 11.8 grams of aconitic acid per liter. In this example, as in Example 1, the resin was practically exhausted and the molasses would be passed through one or more additional columns in a countercurrent manner to effect complete removal of the aconitic acid.

After exhaustion of the resin, the molasses is washed from the bed downflow, and sedimented impurities are flushed from the resin bed by backwash with water until the effluent is clear. The aconitic acid is eluted and recovered as in Example 1.

*Example 3*

The same molasses referred to in Example 1 is treated in the manner described in Example 1 until the anion exchange resin is exhausted. In this case, the resin bed, after washing to remove molasses and readily removable impurities, is eluted by a passage of a solution of 10% hydrochloric acid downflow at a rate equivalent to 0.04 volumes of acid per volume of resin per minute. A fraction containing much of the color adsorbed upon the resin is first eluted. Fractionation of the aconitic acid then occurs. In the first aconitic acid fraction, equal to one volume per volume of resin, the aconitic acid content was 33.1 grams per liter; in the second fraction, 10.5 grams; the third fraction 3.3 grams; and the fourth fraction 1.1 grams of aconitic acid per liter.

The aconitic acid is recovered and purified as in Example 1.

The eluted resin in this case is already in the chloride form and may receive another molasses cycle directly.

*Example 4*

Cuban blackstrap molasses is diluted to 30° Brix and is pumped downflow, as in Example 1, over a bed of the weakly basic ion exchange resin (Amberlite IR4B) which, in this case, is in the sulphate form. The feed molasses contains 14.8 grams of aconitic acid per liter. In a test carried out in a single column, the first two volumes of molasses effluent per volume of resin contained 1.3 grams per liter of aconitic acid; the next two volumes contained 2.1 grams; the next two volumes 3.5 grams; the next three volumes 9.4 grams; and the thirteenth volume 12.9 grams aconitic acid per liter. For the complete removal of the molasses, it would be passed through one or more successive columns in a counterflow manner.

The exhausted resin bed is washed and prepared for elution as in Example 1; and the aconitic acid is eluted with 10% sulphuric acid and the product is recovered and purified as in Example 1. The resin in the sulphate salt form, after elution, is ready for the next cycle of molasses.

*Example 5*

Blackstrap molasses is diluted to 30° Brix with water. The aconitic acid content is 14.6 grams per liter. It is pumped downflow over a bed of the weakly basic anion exchange resin (Amberlite IR4B) in the acetate salt form. The flow rate is .15 volumes of feed per volume of resin per minute. The resin in this case was practically exhausted in the single column after the passage of about 10 volumes of molasses through it. The column is washed to remove molasses, and the resin is thoroughly backwashed. The aconitic acid is eluted with a solution of 10% sulphuric acid and is purified and recovered as in Example 1.

The eluted resin is reconverted to the acetate salt form by a rinse with three volumes of 10% sodium acetate solution and is ready for another cycle of molasses.

*Example 6*

Blackstrap molasses is diluted to 50° Brix with water. It has a pH of 5.9 and an aconitic acid content of 24.4 grams per liter. The diluted molasses is pumped over a bed of anion exchange resin in chloride salt form (Amberlite IR4B) in a rubber-lined anion exchange cell at a molasses feed rate equivalent to 0.05 volumes per volume of resin per minute. Six such anion exchange cells are utilized as illustrated in Fig. 2. Three cells are maintained on stream with molasses in process while three are maintained in various stages of regeneration.

The molasses flows consecutively through the first three cells as illustrated conventionally in Fig. 2 and the molasses effluent from the third cell is free from aconitic acid. This molasses is reconcentrated to 80° Brix in the continuous evaporator shown in Fig. 2 and then passes to storage as aconitic acid-free molasses.

When the capacity of the resin in the first cell to remove aconitic acid from molasses has been exhausted this cell is removed from the system and the flow of diluted molasses is directed to the inlet of the second cell and simultaneously the effluent from the third cell is directed to the inlet of a freshly regenerated cell. Likewise when the second cell is exhausted the molasses will then first enter the third cell and another freshly regenerated cell is added. In this fashion essentially a counterflow of resin and molasses is obtained.

The resin has a capacity for aconitic acid at around 4 lbs. per cubic foot. When a cell has been removed from the absorption system it is washed with water first downflow and then back flushed to free it of residual molasses.

The aconitic acid which has been absorbed on the resin is then carefully eluted by passing a solution of 10% sulphuric acid downflow over the resin at a rate of 0.03 volumes of acid per volume of resin per minute. As the acid gradually traverses the resin bed a fraction of coloring material free of aconitic acid is first eluted. This is contained in a volume approximating three-quarters of the volume of the resin. The pH then drops sharply below 3 and a fraction rich in aconitic acid is collected containing around 8% aconitic acid and 1% sulphuric acid and corresponding in volume to about 0.7 the volume of the resin. This fraction contains around 85% of the aconitic acid adsorbed by the cell. This fraction of eluate is directed to the aconitic acid recovery system shown in Fig. 3.

Thereafter approximately 1.5 volumes of eluate are obtained rich in sulphuric acid and containing the residual aconitic acid from the resin bed. This is recycled to the partially exhausted sulphuric acid tank for resin elution.

The completely eluted resin is now in the sulfate form. It is rinsed with water and then with 2 volumes of salt (NaCl) solution to convert it to the chloride salt form. After another water rinse the bed is backwashed and settled and is then ready again to be placed on stream with molasses.

As indicated in the flow sheet diagram of Fig. 3 the aconitic acid rich fraction is crystallized in the first evaporator crystallizer to yield crude aconitic acid which is separated from the mother liquor in the centrifuge. A portion of the mother liquor is recycled to the first crystallizer and part to the partially exhausted sulphuric acid tank for elution.

The crude aconitic acid crystals are redissolved in water in the bentonite treater where a bentonite-filter aid slurry is added for decolorization purposes. The bentonite added is 1% of the aconitic acid. The slurry from the bentonite treater is filtered and the filtrate is then passed downflow over a bed of decolorizing resin (Permutit SD-102) which has been regenerated with dilute caustic and dilute sulphuric acid. Ten volumes of solution are treated per volume of resin. The decolorized solution of aconitic acid is then pumped to the second evaporator crystallizer from which pure aconitic acid is obtained by centrifuging. The crystals are washed, dried in the rotary drier and then pulverized.

The mother liquor from the second crystallizer is recirculated to the first crystallizer or to the bentonite treater or to the partially exhausted dilute sulphuric acid tank for elution, or in part to two or more of such further places of further treatment.

In our companion application Ser. No. 179,061, we have set forth a process of treating blackstrap and other molasses in which the diluted molasses is first subjected to a defecation process to remove suspended aconitates and other suspended material therefrom, and in which the defecated molasses is then passed through an anion exchange resin to recover the remaining aconitic acid content from the molasses and in which the aconitic acid is removed from the resin by elution with a diluted mineral acid.

The process of the present invention is distinguished from the process of said companion application by the elimination of the preliminary defecation treatment and of the treatment of the aconitates so removed, and by the direct treatment of the blackstrap or other molasses, without defecation, with the weakly basic anion exchange resin to remove not only the aconitic acid of the aconitates in solution but also the aconitic acid of suspended aconitates which are dissolved during the treatment.

In prior methods of recovering aconitic acid from molasses by precipitation of insoluble aconitates therefrom the yield is variable and incomplete, and aconitates are left in the effluent molasses. Where the aconitic acid is separated from the molasses in part as insoluble aconitates and in part by subsequent treatment of the defecated molasses with the resin, further treatment is required of both the precipitated aconitates and of the aconitic acid to be recovered by and from the resin.

The present process involves a minimum of operating steps, and the operation is simple and readily controlled and enables substantially all of the aconitic acid to be recovered from the molasses in a single operation.

The present invention also presents advantages in the fractional elution of the exhausted resin whereby a fraction rich in aconitic acid can be recovered freed from much of the coloring matter which is likewise adsorbed by the resin; and other products present in the resin can similarly be fractionally recovered by careful elution.

It is a particular advantage of the present process that it enables both soluble and insoluble aconitate to be removed from the molasses. While in a strict sense ion exchange occurs between ions in solution, nevertheless in the present process a product is recovered from suspended solids by ion exchange, which appears to be explained by the fact that the solid aconitates dissolve and become available for ion exchange as those ions in solution are removed.

It is another advantage of the process that the elution of the resin to recover aconitic acid therefrom can be effected with acids which will simultaneously regenerate the resin for another cycle.

The present process gives, as one of the products of the process, an aconitic acid-free molasses which, after reconcentration, is for all practical purposes the same as the original blackstrap molasses except for the removal of aconitic acid and small amounts of other constituents therefrom and the increase in chloride content, due to the anion exchange treatment.

While the invention has been more particularly described in connection with the treatment of blackstrap molasses, it is also applicable to the treatment of other molasses, such as B molasses and sorghum molasses for the recovery of aconitic acid therefrom, including blackstrap and other molasses of various origins such as Cuban, Puerto Rican, Hawaiian and Louisianan cane molasses and sorghum molasses.

We claim:

1. The method of recovering aconitic acid from blackstrap and other molasses which comprises passing diluted molasses containing aconitates both in solution and in suspension therein through a series of bodies of a weakly basic anion exchange resin, which resin has been converted to the salt form by treatment with a mineral acid, with a rate of flow of the diluted molasses through the resin bodies which will effect substantially complete removal of the aconitic acid of the aconitates in solution and in suspension from the molasses, with release of the mineral acid of the resin salt and formation of a resin aconitate, and with adsorption of coloring matter from the molasses by the resin, removing each of said bodies from the series after it has been converted to resin aconitate, washing such bodies to remove molasses therefrom, and eluting the coloring matter and aconitic acid from such bodies by treatment with a dilute solution of a mineral acid passed through the resin body at a slow rate to allow the resin and eluting solution to approach equilibrium conditions, whereby an eluate fraction is first obtained containing most of the coloring matter, followed by an eluate fraction rich in aconitic acid and a later fraction poor in aconitic acid and rich in mineral acid.

2. The process according to claim 1 in which the fraction poor in aconitic acid and rich in mineral acid is returned for admixture with the eluent acid for eluting a further body of the resin aconitate.

3. The process according to claim 1, in which the resin used is one which has been converted to the chloride form by treatment with hydrochloric acid and in which the resin, from which the aconitic acid has been eluted, is reconverted into the chloride form for further use.

4. The process according to claim 1, in which the bodies of resin aconitate are eluted with a dilute mineral acid of from about 4% to 15% strength and in which a highly colored eluate fraction is first obtained substantially free from aconitic acid, an intermediate fraction is then obtained which contains the greater part of the aconitic acid, and a later fraction is obtained with a small amount of aconitic acid and a large amount of mineral acid.

5. The process according to claim 1, in which diluted sulfuric acid of approximately 10% to 15% strength is used for eluting the aconitic acid and coloring matter from the resin aconitate.

R. WINSTON LIGGETT.
ERNEST L. WIMMER.

(References on following page)

References Cited in the file of this patent

UNITED STATES PATENTS

| Number | Name | Date |
|---|---|---|
| 2,341,907 | Cheetham et al. | Feb. 15, 1944 |
| 2,345,079 | Ventre et al. | Mar. 28, 1944 |
| 2,388,195 | Vallez | Oct. 30, 1945 |
| 2,388,222 | Behrman | Oct. 30, 1945 |
| 2,415,558 | Hesler et al. | Feb. 11, 1947 |
| 2,457,117 | Bernardi | Dec. 28, 1948 |
| 2,470,500 | Lawrence | May 17, 1949 |
| 2,481,557 | Ambler et al. | Sept. 13, 1949 |
| 2,513,287 | Collier | July 4, 1950 |
| 2,514,010 | Reeves | July 4, 1950 |
| 2,561,695 | Gustafson | July 24, 1951 |

OTHER REFERENCES

Nachod "Ion Exchange" (academic), pp. 306, 310 (1949).

Kunin et al., "Ion Exchange Resins," (Wiley), pp. 67-68 (1950).

Dickinson, Chem. Abstracts, vol. 42, col. 8002 (1948).

Mariani, Chem. Abstracts, vol. 42, col. 8002 (1948).

Garino, Chem. Abstracts, vol. 42, col. 8003 (1948).